United States Patent [19]

Meisel, Jr.

[11] 4,152,000

[45] May 1, 1979

[54] VEHICLE SUSPENSION STABILIZING SYSTEM

[75] Inventor: Thomas C. Meisel, Jr., Peoria, Ill.

[73] Assignee: Caterpillar Tractor Co., Peoria, Ill.

[21] Appl. No.: 815,875

[22] Filed: Jul. 15, 1977

[51] Int. Cl.² ............................................. B60G 11/26
[52] U.S. Cl. ..................................... 280/6 H; 188/272
[58] Field of Search ................ 280/6 H, 702; 188/272

[56] References Cited

U.S. PATENT DOCUMENTS

| | | | |
|---|---|---|---|
| 3,039,789 | 6/1962 | Schnuerle | 280/104.5 |
| 3,165,363 | 1/1965 | Behles | 280/6 H |
| 3,264,008 | 8/1966 | Allinquant | 280/6 H |
| 3,953,040 | 4/1976 | Unruh | 280/6 H |

Primary Examiner—Philip Goodman
Attorney, Agent, or Firm—Charles E. Lanchantin, Jr.

[57] ABSTRACT

A vehicle suspension stabilizing system having a frame, a wheel assembly having a wheel rotatable about an axis, the wheel assembly being pivotally connected to the frame offset of the axis, a brake assembly associated with the wheel assembly, the brake assembly being of a construction for braking the wheel in an engaged position, and a coupling connected between the frame and the wheel assembly for inhibiting oscillatory movement of the wheel assembly relative to the frame in response to movement of the brake assembly toward the engaged position.

15 Claims, 3 Drawing Figures

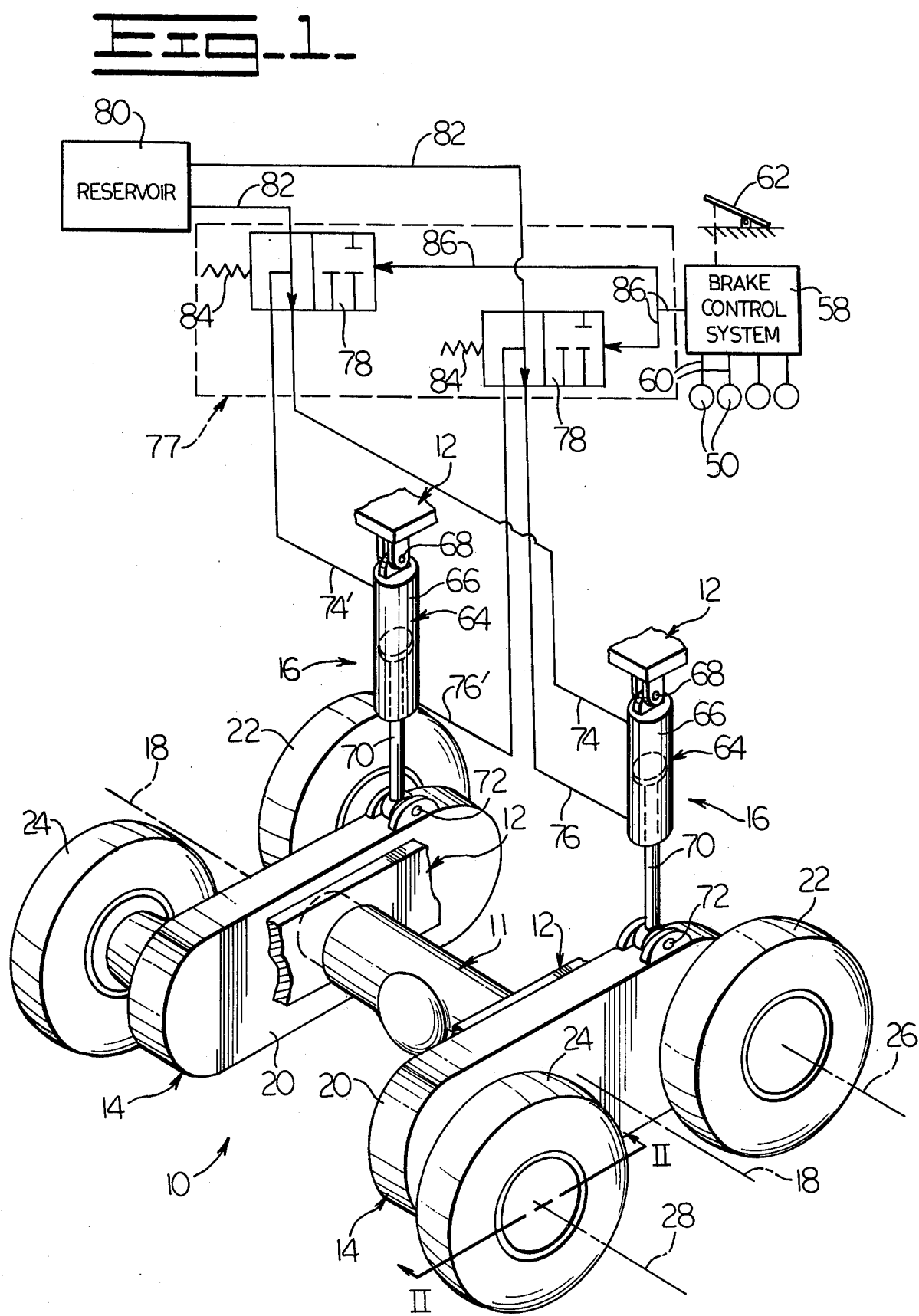

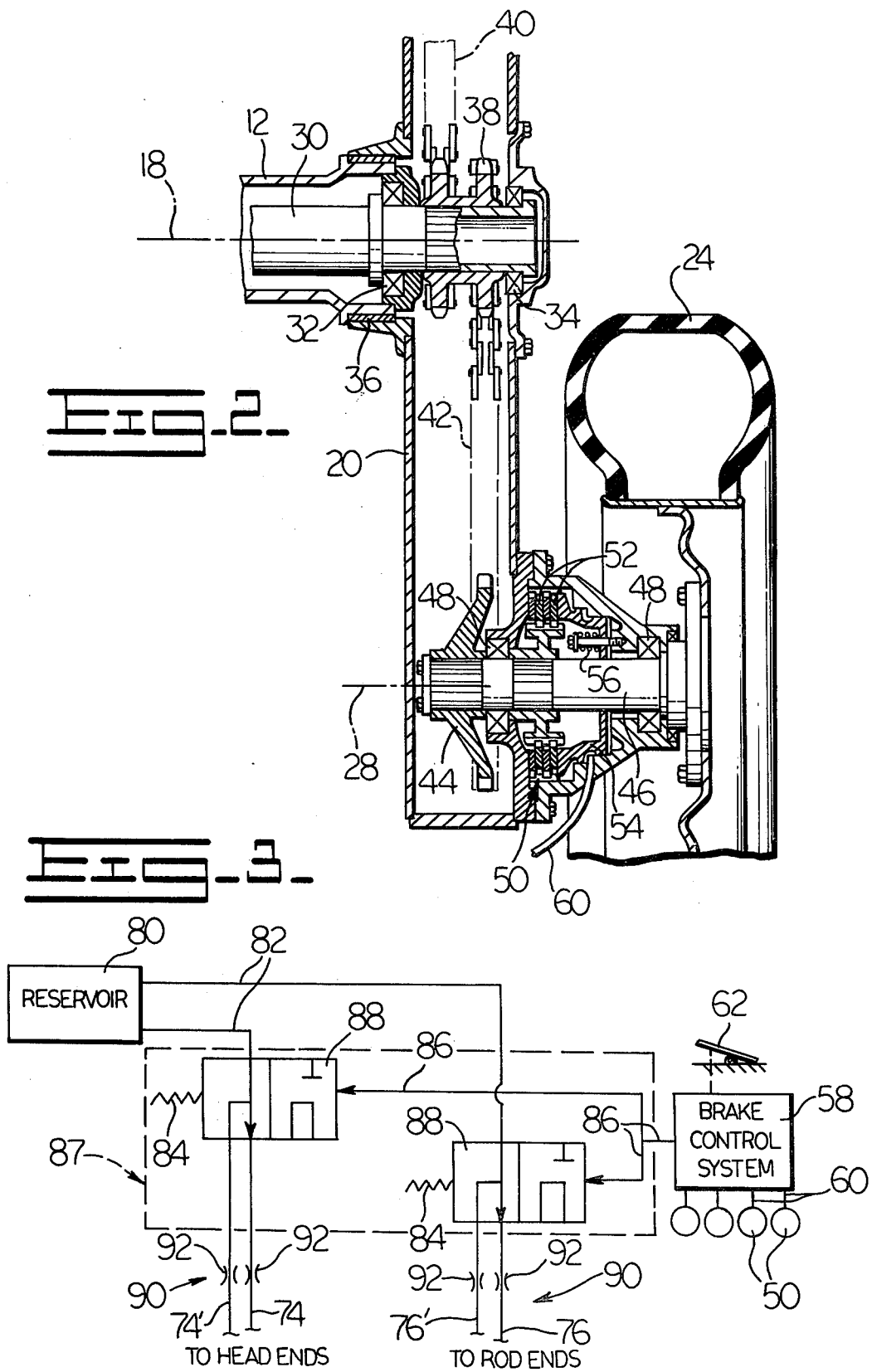

VEHICLE SUSPENSION STABILIZING SYSTEM

BACKGROUND OF THE INVENTION

The present invention is related to a suspension stabilizing system for a vehicle, and more particularly to a suspension system which can selectively restrict oscillatory movement of a wheel assembly in response to actuation of the brake control system of the vehicle.

When a vehicle such as an earthmoving motor grader is braked, the tandem wheel assemblies experience overturning forces so that the ground-engaging pressure of one of the tandem tires is increased while it is reduced on the other of the tandem tires. This decreases the effectiveness of the braking action, causes unequal wear of the tires, and may impose excessive loads on the tires.

Another problem is that when a motor grader travels at high speeds over irregular terrain the freely oscillatable tandem wheel assemblies can react excessively quickly to such conditions so that undesirable shocks and stresses are transmitted to the frame and to the operator.

SUMMARY OF THE INVENTION

The present invention is directed to overcoming one or more of the problems as set forth above.

According to the present invention there is provided a vehicle suspension stabilizing system having a frame, a wheel assembly having a wheel rotatable about an axis, the wheel assembly being pivotally connected to the frame offset of the axis, a brake assembly associated with the wheel assembly, the brake assembly being of a construction for braking the wheel in an engaged position, and coupling means connected between the frame and the wheel assembly for inhibiting oscillatory movement of the wheel assembly relative to the frame in response to movement of the brake assembly toward the engaged position.

BRIEF DESCRIPTION OF THE DRAWINGS

FIG. 1 is a diagrammatic view showing a preferred vehicle suspension stabilizing system constructed in accordance with the present invention, with a fragmentary portion of the vehicle suspension illustrated in perspective and with a control portion therefor illustrated in line and block schematic form.

FIG. 2 is a diagrammatic and fragmentary horizontal section of the vehicle suspension stabilizing system taken along line II—II of FIG. 1.

FIG. 3 is a fragmentary view of an alternate embodiment control portion which may be compared to a corresponding portion illustrated in FIG. 1.

DETAILED DESCRIPTION

Referring to FIG. 1, a vehicle suspension stabilizing system 10 for a vehicle such as a conventional motor grader 11 is shown which is constructed in accordance with the present invention. The suspension system includes a vehicle frame, identified generally by the reference numeral 12, a pair of tandem wheel assemblies 14 individually pivotally mounted on the opposite sides of the frame, and coupling means or a coupling 16 connected between the frame and each of the tandem wheel assemblies. Each of the tandem wheel assemblies 14 is rotatable on the frame 12 for rocking movement about a central axis 18 arranged transverse to the normal direction of movement of the vehicle, and each is of similar construction so that only one need be described herein. Each tandem wheel assembly has a wheel supporting tandem housing 20 with a pair of wheels 22 and 24 mounted thereon, the wheels being respectively mounted on an axis 26 and on an axis 28 offset forwardly and rearwardly of the central axis an identical and preselected distance. As best shown in FIG. 2, a drive shaft 30 is rotatably supported on the frame as by a bearing 32, and the tandem housing may be mounted on the drive shaft by a bearing 34 and on the frame by a bearing 36. A double sprocket member 38 is splinably mounted on the drive shaft and a pair of endless chains 40 and 42 are trained thereover so that they extend respectively forwardly and rearwardly to similar wheel groups for engagement about a corresponding sprocket 44 secured to a wheel spindle or stub shaft 46, only one of each being therefor shown. The wheel spindles are rotatably mounted in the tandem housing as by a pair of laterally spaced apart bearings 48 and are secured to the individual wheels 22 and 24.

Furthermore, a disc brake assembly 50 is preferably associated with each of the wheels 22 and 24 protectedly within the tandem housing 20. The brake assemblies have a plurality of interleaved plates 52 alternately splined to the housing and to the wheel spindle 46, and an annular piston 54 is disposed for reciprocating movement in the housing and mechanically biased toward a disengaged position or to the right when viewing the drawing by a plurality of compression springs 56. The annular piston is moved to the left to a brake engaging position whereat the plates are clamped together by fluid pressure selectively supplied thereto from a conventional brake control system 58 via a brake supply conduit 60 as is diagrammatically indicated in FIG. 1. For example, manual depression of a brake pedal 62 connected to the control system allows delivery of fluid pressure proportionally to the individual supply conduits 60 and to the brake assemblies 50 for retarding or stopping movement of the motor grader 11.

In general, the construction of the tandem wheel assemblies 14 and the individual disc brake assemblies 50 is known as is more completely set forth in U.S. Pat. No. 2,280,741 issued Apr. 21, 1942 to R. H. Bolster et al. and Pat. No. 3,727,711, issued Apr. 17, 1973 to J. R. Sebern, respectively.

More particularly, and as shown best in FIG. 1, each of the coupling means 16 of the suspension stabilizing system 10 includes a fluid-containing strut or telescoping jack 64 which is preferably connected in a substantially upright or vertical manner between one of the tandem wheel assemblies 14 and the vehicle frame 12. Each jack preferably has a cylinder portion 66 connected to the frame at a pivot joint 68, and a piston and rod portion 70 connected to the tandem housing 20 at a pivot joint 72 disposed a preselected lever arm distance away from the central axis 18. It should be appreciated, however, that such jack connection could be reversed.

Referring now to the fluid control system for the jacks 64, it is apparent that a pair of head end conduits 74 and 74' and a pair of rod end conduits 76 and 76' communicate fluid between the respective jacks and a valve means 77. While such valve means is preferably a single valve having two modes of operation, a pair of two-position valves 78 are shown for illustrative convenience. The valves are preferably disposed adjacent to or elevationally above the jacks and are in open fluid communication with a reservoir 80 located elevationally above them by a pair of supply conduits 82.

The valves 78 have a first position as shown in FIG. 1 wherein they are individually biased rightwardly to a normal operating position by a resilient element or coiled compression spring 84. In such first position of the valves the supply conduits 82 are in open communication with the conduits 74, 74', 76, and 76' so that fluid may flow under gravity from the reservoir 80 to either end of the telescoping jacks 64.

The valves 78 further have a second or braking position wherein they are individually biased to the left when viewing FIG. 1 against the action of the spring 84 by fluid pressure supplied thereto from the brake control system 58 and through a signal conduit 86. It is contemplated that such fluid pressure signal may be either air or hydraulic fluid.

OPERATION

Under normal traveling conditions of the motor grader 11 no pressurized fluid is present in the signal conduits 86, and hence valve means 77 is in its first position as illustrated in FIG. 1. Consequently, as the motor grader traverses uneven terrain the wheels 22 and 24 are free to follow the contour of the ground and the two tandem housings 20 oscillate therewith. Under these conditions the jacks 64 do not to any significant degree retard the free oscillatory motion of the tandem wheel assemblies 14, since the fluid in the jacks is free to communicate between the opposite ends thereof and the reservoir 80 via the interconnected conduits 74, 74', 76, 76', and 82, and the valves 78.

On the other hand, when the vehicle brake assemblies 50 are moved toward their engaged positions by operator depression of the brake pedal 62, pressure fluid is not only connected to the brake assemblies from the brake control system 58, but also is simultaneously directed to the valve means 77 by way of the signal conduit 86. As a consequence, the valves 78 are instantaneously shifted to the left to their second positions whereat the conduits 74, 74', 76, 76' and 82 are blocked at the valves. Since fluid cannot then escape from the opposite ends of the jacks 64, the jacks become substantially rigid links to automatically restrict further oscillatory movement of the individual tandem wheel assemblies 14. This negates overturning forces on the tandem housings 20 as a result of the engagement of the brake assemblies 50, and maintains the tandem housings in a substantially horizontal position with respect to the ground so that the tires 22 and 24 experience substantially equal pressures against the ground.

In the alternate embodiment shown in FIG. 3 most of the elements described above are incorporated and, accordingly, identical reference numerals have been applied thereto. The alternate embodiment differs, however, in that a modified two-position valve means 87 is utilized and flow inhibiting means 90 are associated with each of the conduits 74, 74', 76, and 76'. Specifically, while the construction of the valve means illustrated by a pair of valves 88 in the alternate embodiment causes the same mode of operation as the preferred embodiment in its first position shown, in the second or braking position the head end conduits 74 and 74' and the rod end conduits 76 and 76' of the jacks 64 are placed in direct communication with each other rather than being blocked. This cross coupling of the conduits leading to the head ends or the rod ends of both jack inhibits simultaneous pivotal movement of both of the tandem wheel assemblies 14 in the same direction as when viewed in side elevation. This tends to equalize loads on the tires. Advantageously, movement of the tandem wheel assemblies in opposite rotational directions is not inhibited so that shock absorption can occur through fluid transfer between the opposite jacks 64.

In addition, the flow inhibiting means 90, which may take the form of a relatively simple flow restricting orifice 92 in series with each of the conduits 74, 74', 76, and 76' can be tailored in size or construction to dampen the rate of movement of the wheel assemblies 14 to almost any degree desired. It is to be recognized that as shown in FIG. 3 the orifices 92 will also function in the first position of the valves 88, tending to slow down any transfer of fluid between the jacks 64, the conduits 74, 74', 76, and 76' and the supply conduits 82 leading to the reservoir 80. This decreases the rate of response of movement of the tandem wheel assemblies as the wheels 22 and 24 travel over irregular terrain at higher vehicle speeds, resulting in the cushioning of undesirable shocks and stresses to the frame and to the operator. It is further contemplated that the orifices 92 may be deleted from their series positions with the conduits 74, 74', 76 and 76' and that passages within the single valve means 87 and not shown can be provided to restrict flow between the conduits 74, 74', 76 and 76' solely in the second or braking position.

It is further to be undertood that the flow inhibiting means 90 may be used with the stabilizing system of FIG. 1. However, since the valve means 77 completely blocks flow to the jacks 64 in the second or braking position, such flow inhibiting means could restrict the rate of fluid transfer between the reservoir 80, the conduits 74, 74', 76 and 76' and the jacks during normal travel to provide a preselected degree of shock absorption.

In view of the foregoing, it is readily apparent that the stabilizing system 10 of the present invention provides an improved coupling means 16 between a vehicle frame 12 and a wheel assembly 14. Such coupling means can either automatically stop or completely block oscillatory movement of the wheel assembly slightly prior to or during engagement of the brake control system 58, or at the very least can automatically inhibit such movement during braking in order to assure more nearly equal pressures between the respective front and rear tires under such circumstances. It is further contemplated that the stabilizing system 10 may be adapted to a housing which supports only one of the wheels 22 or 24 in a pivotal manner offset from the axis 18, it being desired in such instance to merely provide a more rigid vehicle suspension of the one wheel during braking.

Other aspects, objects and advantages will become apparent from a study of the specification, drawings and appended claims.

The embodiments of the invention in which an exclusive property or privilege is claimed are defined as follows:

1. A vehicle suspension stabilizing system comprising:
   a frame;
   a wheel assembly having a wheel rotatable about an axis, said wheel assembly being pivotally connected to said frame offset of said axis;
   a brake control system having a brake assembly associated with said wheel assembly and being moveable between an engaged position and a disengaged position, said brake assembly being of a construction for braking said wheel in said engaged position; and coupling means connected between said frame and said wheel assembly for automatically inhibiting oscillatory movement of said wheel assembly relative to said frame in response to movement of said brake assembly toward said engaged position.

2. The vehicle suspension stabilizing system of claim 1 wherein said coupling means includes a fluid-containing strut.

3. The vehicle suspension stabilizing system of claim 2 wherein said strut has a cylinder portion and a piston and rod portion, said piston and rod portion being telescopically movable within said cylinder portion, and one of said cylinder portion and said piston and rod portion being connected to said frame and the other being connected to said wheel assembly.

4. The vehicle suspension stabilizing system of claim 3 wherein said coupling means includes a source of fluid, a valve connected to said source of fluid, and a pair of conduits connected to said valve and to said strut, said valve being moveable between a first position and a second position, said valve being moveable to said second position in response to movement of said brake assembly toward said engaged position, and said valve being of a construction sufficient for restricting flow of fluid in said pair of conduits in said second position.

5. The vehicle suspension stabilizing system of claim 4 wherein said source of fluid is a reservoir, said reservoir being located at an elevation greater than said valve and said strut.

6. The vehicle suspension stabilizing system of claim 5 wherein said wheel assembly has second wheel and a tandem housing, said housing being pivotally connected to said frame on a central axis and being of a construction sufficient for supporting said first wheel and said second wheel on opposite sides of said central axis.

7. The vehicle suspension stabilizing system of claim 4 wherein said valve couples said pair of conduits to each other and to said source of fluid in said first position of said valve.

8. The vehicle suspension stabilizing system of claim 7 including flow inhibiting means associated with said pair of conduits for dampening movement of said wheel assembly.

9. The vehicle suspension stabilizing system of claim 1 wherein said coupling means includes a telescopic jack having a cylinder portion and a piston and rod portion, a source of fluid, a valve connected to said source of fluid, and a pair of conduits connected to said valve and to the opposite ends of said telescopic jack, said valve being movable between a first position at which said source is in fluid communication with said pair of conduits and a second position blocking fluid flow from said source and inhibiting fluid flow in said pair of conduits.

10. The vehicle suspension stabilizing system of claim 9 wherein said valve completely blocks each of said pair of conduits at said second position.

11. The vehicle suspension stabilizing system of claim 9 including flow-restricting passage means associated with said pair of conduits.

12. The vehicle suspension stabilizing system of claim 1 wherein said wheel assembly is a tandem wheel assembly, said system including a second tandem wheel assembly on the opposite side of the vehicle, said brake control system being of a construction sufficient for braking said wheels in said tandem wheel assemblies, and said coupling means being of a construction sufficient for inhibiting oscillatory movement of said tandem wheel assemblies during braking.

13. The vehicle suspension stabilizing system of claim 12 wherein said coupling means includes a pair of fluid-operated telescopic jacks individually connected between one of said tandem wheel assemblies and said frame, said system including a source of fluid, and means for selectively communicating said source of fluid with said jacks or for controllably inhibiting fluid flow to and from said jacks in response to operation of said brake control system.

14. The vehicle suspense stabilizing system of claim 12 wherein said coupling means includes a pair of telescopic jacks, each jack having a head end and a rod end and being connected between one of said tandem wheel assemblies and said frame, said system including means for communicating a fluid interconnectingly between said head ends of said jacks and said rod ends of said jacks for cross coupled operation thereof in response to operation of said brake control system.

15. In a vehicle of the type having a frame, a wheel assembly having a wheel rotatable about an axis, a brake assembly moveable between an engaged position braking the wheel and a disengaged position permitting the wheel to rotate, the improvement comprising:
coupling means for stabilizing oscillatory movement of said wheel assembly relative to said frame, said coupling means being connected between said frame and wheel assembly; and
control valve means for automatically actuating said coupling means to a condition inhibiting oscillatory movement of said wheel assembly relative to said frame in response to movement of said brake assembly toward said engaged period.

* * * * *

UNITED STATES PATENT AND TRADEMARK OFFICE
CERTIFICATE OF CORRECTION

PATENT NO. : 4,152,000
DATED : May 1, 1979
INVENTOR(S) : Thomas C. Meisel, Jr.

It is certified that error appears in the above-identified patent and that said Letters Patent are hereby corrected as shown below:

In column 6, line 50, "period" should be -- position --.

Signed and Sealed this

Eleventh Day of September 1979

[SEAL]

Attest:

*Attesting Officer*

LUTRELLE F. PARKER
*Acting Commissioner of Patents and Trademarks*